(12) United States Patent
Gilbert et al.

(10) Patent No.: US 9,769,254 B2
(45) Date of Patent: *Sep. 19, 2017

(54) PRODUCTIVE SPEND METRIC BASED RESOURCE MANAGEMENT FOR A PORTFOLIO OF DISTRIBUTED COMPUTING SYSTEMS

(71) Applicant: CA, INC., Islandia, NY (US)

(72) Inventors: Peter James Gilbert, Teaneck, NJ (US); Lara Virginia Greden, Reston, VA (US)

(73) Assignee: CA, INC., Islandia, NY (US)

( * ) Notice: Subject to any disclaimer, the term of this patent is extended or adjusted under 35 U.S.C. 154(b) by 179 days.

This patent is subject to a terminal disclaimer.

(21) Appl. No.: 14/486,554

(22) Filed: Sep. 15, 2014

(65) Prior Publication Data

US 2016/0080482 A1   Mar. 17, 2016

(51) Int. Cl.
  *G06F 15/173* (2006.01)
  *H04L 29/08* (2006.01)
  *H04L 12/24* (2006.01)
  *H04L 12/26* (2006.01)

(52) U.S. Cl.
  CPC ...... *H04L 67/1008* (2013.01); *H04L 41/0896* (2013.01); *H04L 41/5025* (2013.01); *H04L 41/5096* (2013.01); *H04L 43/0817* (2013.01)

(58) Field of Classification Search
  CPC .................................................. H04L 67/1008
  See application file for complete search history.

(56) References Cited

U.S. PATENT DOCUMENTS

| 7,644,051 B1 * | 1/2010 | Moore ................. G05B 13/027 706/16 |
| 2008/0123559 A1 * | 5/2008 | Haviv ....................... G06F 8/61 370/255 |
| 2009/0106571 A1 * | 4/2009 | Low ..................... G06F 9/4856 713/310 |
| 2010/0094948 A1 * | 4/2010 | Ganesh ................. G06F 9/4856 709/212 |
| 2011/0077795 A1 * | 3/2011 | VanGilder ............... G06F 1/206 700/300 |
| 2011/0125894 A1 * | 5/2011 | Anderson ............. H04L 9/3213 709/224 |
| 2012/0109705 A1 * | 5/2012 | Belady ............ G06Q 10/06312 705/7.22 |
| 2012/0109844 A1 * | 5/2012 | Devarakonda ....... G06Q 10/067 705/348 |
| 2013/0042234 A1 * | 2/2013 | DeLuca .............. G06F 9/45558 718/1 |

(Continued)

*Primary Examiner* — Dhairya A Patel
(74) *Attorney, Agent, or Firm* — Sage Patent Group

(57) ABSTRACT

A method of operating a resource management node includes, for each of a plurality of resources available in a plurality of distributed computing systems, determining a productive spend metric based on utilization of the resource and cost associated with making the resource available in the distributed computing system. Relocation of workload of selected ones of the resources between the plurality of distributed computing systems is controlled based on the productive spend metrics determined for the selected ones of the resources. Related computer program products and resource management nodes are disclosed.

17 Claims, 13 Drawing Sheets

(56) References Cited

U.S. PATENT DOCUMENTS

| | | | |
|---|---|---|---|
| 2013/0191534 A1* | 7/2013 | Neuse | G06Q 30/0283 709/224 |
| 2014/0040899 A1* | 2/2014 | Chen | G06F 9/5094 718/102 |
| 2014/0297835 A1* | 10/2014 | Buys | H04L 43/0817 709/224 |

* cited by examiner

| Type | Name | Facility Capacity | | IT Capacity | | Efficiency | Risk | Business |
|---|---|---|---|---|---|---|---|---|
| owned | Location A | Power 4.6 MW<br>Space 34,435 sq. ft.<br>Cooling 244 Tons | | Compute 452 Rx<br>Network 4.3 Mbps<br>Storage 3552 TB<br>% virtualized 61% | | PUE 1.2 | 4 issues | 35% Productive Spend |
| co-location (COLO) | COLO Provider A | Power 4.6 MW<br>Space 34,435 sq. ft.<br>Cooling 244 Tons | | Compute 452 Rx<br>Network 4.3 Mbps<br>Storage 3552 TB<br>% virtualized 61% | | PUE 1.7 | 2 issues<br>Elimination Plan | 42% Productive Spend |
| co-location (COLO) | COLO Provider B | Power 4.6 MW<br>Space 34,435 sq. ft.<br>Cooling 244 Tons | | Compute 452 Rx<br>Network 4.3 Mbps<br>Storage 3552 TB<br>% virtualized 61% | | PUE 2.1 | 2 issues<br>2 Outages<br>Maintenance Plan | 64% Productive Spend |

*FIGURE 10*

| Metric | Spend / $M USD | Utilization % | Non-Utilized % | Productive Spend / $M USD |
|---|---|---|---|---|
| Compute | 5m | 20 | 80 | 1 |
| Network | 0.5 | 100 | 0 | 0.5 |
| Storage | 1m | 80 | 20 | 0.8 |
| Power | 0.5m | 50 | 50 | 0.25 |
| Space | 1m | 75 | 25 | 0.75 |
| Cooling | 0 | 100 | 0 | 0 |
| Total | $8M | | | $ 3.3M |

Productive spend metric = % of spend on capacity (for this data center) which is utilized = $3.3M / $8M = 41%

*FIGURE 13*

Relocate Workload of Enterprise Location A to Colocation Provider B

Relocate Workload of Enterprise Location A to Cloud Provider A

Increase Efficiency by Resource Retrofit, Upgrade, and/or Optimization and/or Lowering Facilities Costs According Add Resources to Improve Utilization Data Center Consolidation
(Consolidate Resources of Colocation Sites and Enterprise Site to a Single Large Colocation Provider)

PRODUCTIVE SPEND METRIC BASED RESOURCE MANAGEMENT FOR A PORTFOLIO OF DISTRIBUTED COMPUTING SYSTEMS

BACKGROUND

The present disclosure relates to computer systems, and in particular to controlling deployment of resources across a portfolio of distributed computing systems.

In existing cloud and other distributed computer systems (e.g., data centers), a services creator or system operator generally should know in advance which applications (or types of applications) will be deployed and estimate the numbers and types of physical host machines and other infrastructure that needs to be deployed in the system to support processing of the applications. The capacity of the system can be changed by increasing or decreasing the numbers or types of physical host machines and other infrastructure. During operation, a load balancer can operate to direct requests from user electronic devices to particular ones of the physical host machines for processing by associated applications. Although load balancers can provide better balancing of infrastructure utilization, they may not sufficiently improve the efficiency with which infrastructure is deployed and used, which can have a substantial effect on cost in view of the potential large number of physical host machines and other infrastructure that can be deployed in some distributed computer systems.

Distributed computer systems can include infrastructure that resides in geographically dispersed clusters, such as in data center facilities that are located in different counties, states, or countries. Determining where to deploy or relocate workload among a portfolio of data center facilities can be complicated by the need to adequately consider numerous different factors, such as available capacities of the facility infrastructure resources, utilization of the facility infrastructure resources, costs of the facility infrastructure resources, etc. Substantial differences existing between the functions, operations, capabilities, scalability, etc. of the various facility infrastructure resources has prevented their effective combined analysis in a way that would facilitate decisions regarding the deployment or relocation of resources and workload among a portfolio of available data center facilities.

SUMMARY

Some embodiments disclosed herein are directed to a method of operating a resource management node. The method includes, for each of a plurality of resources available in a plurality of distributed computing systems, determining a productive spend metric based on utilization of the resource and cost associated with making the resource available in the distributed computing system. Relocation of workload of selected ones of the resources between the plurality of distributed computing systems is controlled based on the productive spend metrics determined for the selected ones of the resources.

Some other embodiments disclosed herein are directed to a computer program product that includes a computer readable storage medium having computer readable program code embodied in the medium. The computer readable program code includes computer readable code to, for each of a plurality of resources available in a plurality of distributed computing systems, determine a productive spend metric based on utilization of the resource and cost associated with making the resource available in the distributed computing system. Computer readable code also controls relocation of workload of selected ones of the resources between the plurality of distributed computing systems based on the productive spend metrics determined for the selected ones of the resources.

Other methods, computer program products, and/or resource management nodes according to embodiments will be or become apparent to one with skill in the art upon review of the following drawings and detailed description. It is intended that all such additional methods, computer program products, and/or resource management nodes be included within this description and protected by the accompanying claims.

BRIEF DESCRIPTION OF THE DRAWINGS

Aspects of the present disclosure are illustrated by way of example and are not limited by the accompanying drawings. In the drawings:

FIGS. 9 and 10 illustrate example arrangements of information that may be determined and used to control relocation of resources between distributed computing systems in an available portfolio according to some embodiments;

FIG. 13 is a table of utilization metrics and determined productive spend metrics for a resource of a distributed computing system in accordance with some embodiments;

DETAILED DESCRIPTION

In the following detailed description, numerous specific details are set forth in order to provide a thorough understanding of embodiments of the present disclosure. In some instances well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Figure 1:
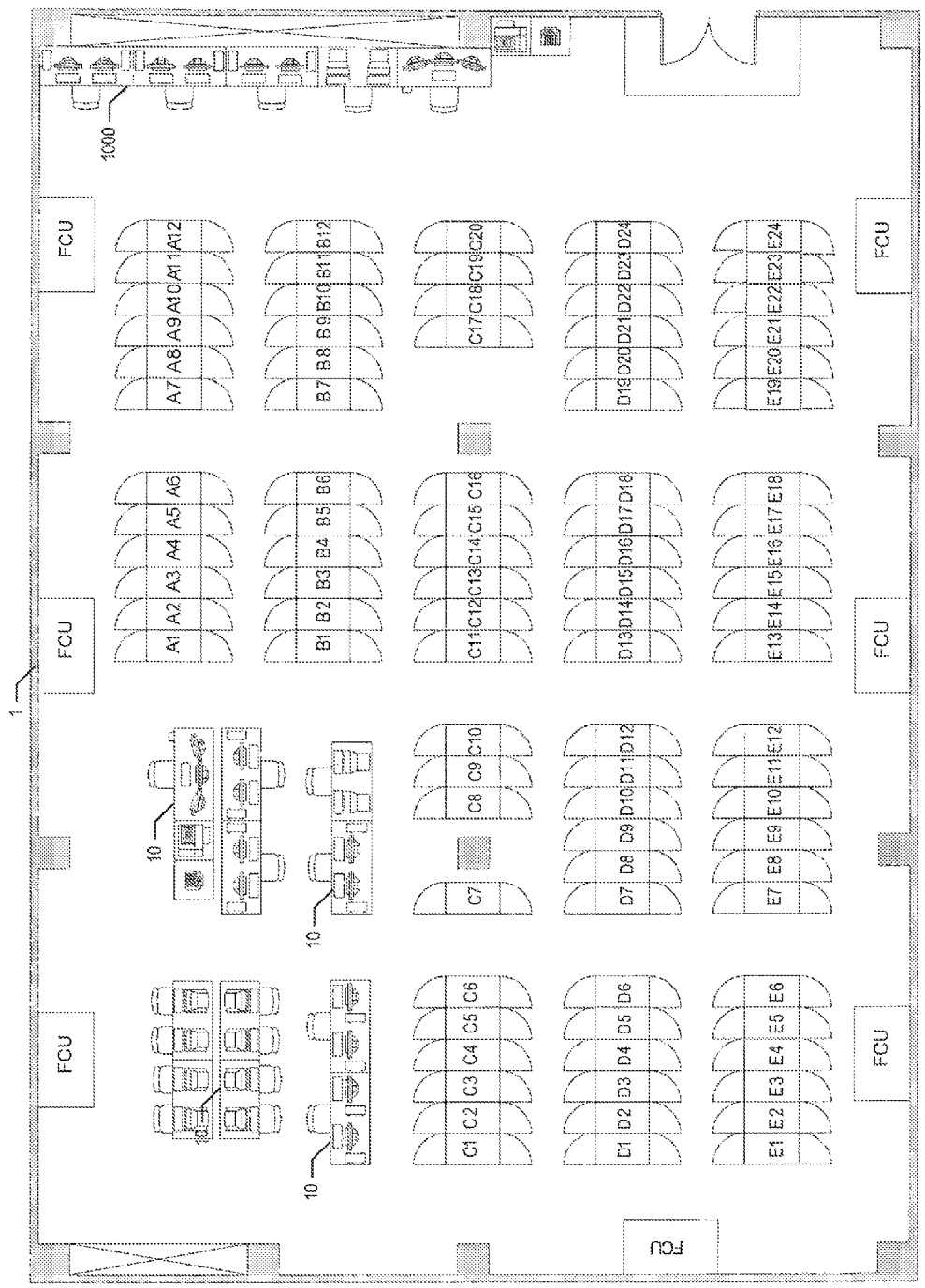
FIG. 1 is a schematic illustration of a cabinet layout in a distributed computer system that is configured as a data center according to some embodiments.

FIG. 1 is a block diagram of a distributed computer system that is configured as a data center 1 according to some embodiments. The data center 1 can include hundreds or thousands of data servers, also referred to as computing resources, which are mounted to physical racks within cabinets. The example data center 1 includes cabinets (also commonly referred to as "racks") A1-12, B1-12, C1-20, D1-24, and E1-24 arranged in rows and columns for accessibility by operators. Each cabinet contains physical storage spaces (e.g., mounting spaces on rack(s), use/unit spaces "U-spaces", etc.) where data servers and other resources can be installed to host guest virtual machines and/or applications, as described further below. Facilities control units (FCU) have electrical power sources (e.g., power conditioning and backup power sources), cooling devices, and other equipment that supports operation of resources in the cabinets. Each cabinet can include a local electrical power supply device(s) and a cooling device(s) that cools resources mounted in the cabinet.

The data servers can consume substantial amounts of electrical power, occupy significant amount of physical rack storage space and floor space, and require substantial cooling heat transfer to remain within an acceptable operational temperature range. The electrical power, physical rack storage space and floor space, cooling, and other support systems are examples of infrastructure resources provided by the data center 1 to support operation of the data servers.

In accordance with some embodiments, the data center 1 includes a resource management node that may reside within one or more of the cabinets or separate therefrom (e.g., within an operator work station or outside the data center), and is configured to operate according to one or more embodiments disclosed herein. A plurality of operator work stations 10 are illustrated having computer processing and display devices for use by operators to monitor operation of the data center 1 and control operation of the resource management node according to one or more embodiments disclosed herein.

Each cabinet and the data center 1 includes data network interfaces, also referred to as network resources, that communicatively interconnect resources in the cabinets. The data servers perform computer operations that provide a plurality of guest virtual machines (VMs) within a plurality of VM clusters. Each VM cluster can include a plurality of guest VMs, and each VM cluster can reside on different data servers or may be distributed across more than one data server.

As will be explained in further detail below, the resource management node can manage relocation of workload among resources and may further manage relocation of resources across a plurality of distributed computing systems, such as data centers, in an available portfolio which can be located at different facility geographic locations that are interconnected by one or more private and/or public (e.g., Internet) data networks. For each distributed computing system facility in a portfolio, a productive spend metric is generated based on normalization of each of the infrastructure resources of the respective distributed computing system facility by the associated cost for providing those infrastructure resources. Separate productive spend metrics can be determined for each of the resources of a distributed computing system facility, and which can be combined (e.g., added with or without relative importance weighting) to generate an overall productive spend metric for the computing system facility. The productive spend metrics for the distributed computing system facilities are compared to enable decisions to be made regarding the relocation and/or deployment of resources, and/or workload among the distributed computing system facilities in the portfolio.

The productive spend metrics can be used to compare and select among different relocation scenarios for relocating resources from one distributed computing system to another distributed computing system. The productive spend metrics can alternatively or additionally be used to compare and select among different upgrade scenarios for adding new resources to a distributed computing system.

These and other operations are explained in further detail below after the following explanation of an example resource node and distributed computing system in which the operations may be performed.

Resource Node of a Distributed Computing System

Figure 2:
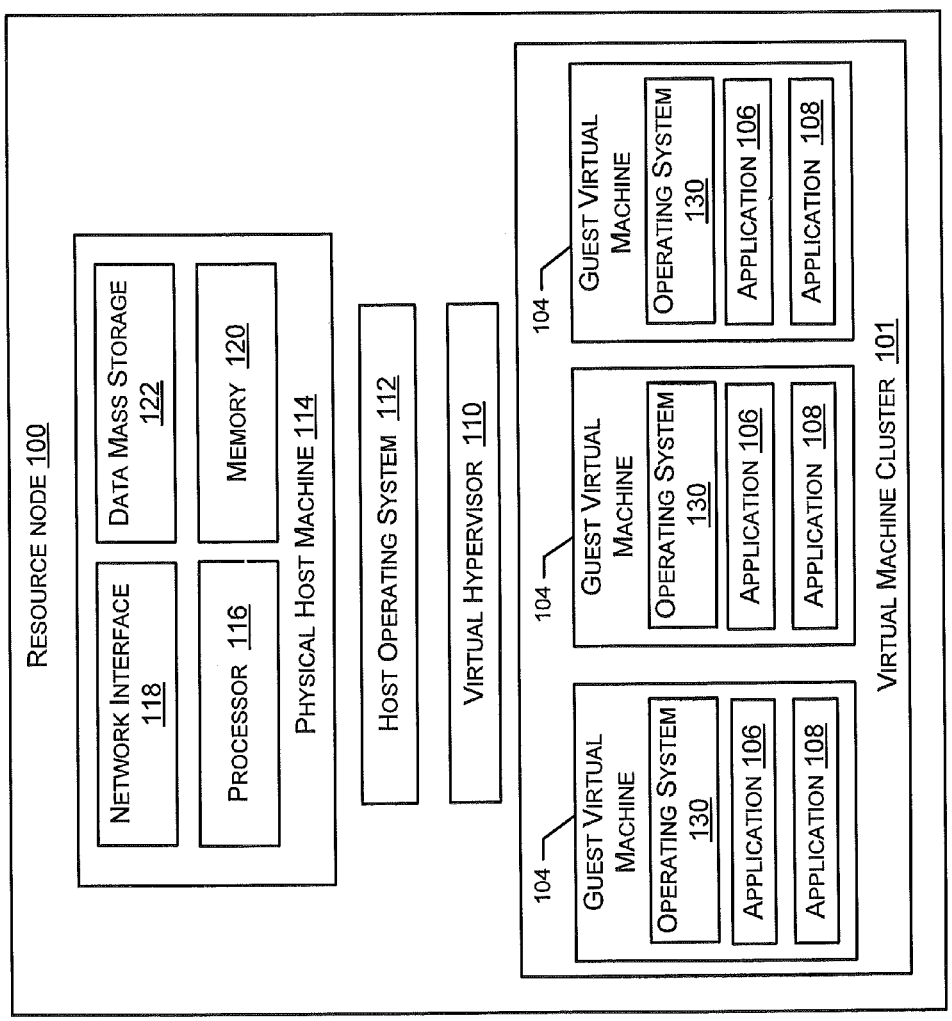
FIG. 2 is a block diagram of a resource node, used in a distributed computing system, that is configured according to some embodiments.

FIG. 2 is a block diagram of a resource node 100 of a distributed computing system that is configured according to some embodiments. Referring to FIG. 2, the resource node 100 includes a physical host machine 114 that performs computer operations to provide one or more VM clusters 101. Each of the VM clusters 101 includes a plurality of guest VMs 104. Each guest VM 104 runs a guest operating system 130 and a plurality of applications 106 and 108. The computing needs of users (e.g., humans and/or other virtual/non-virtual machines) drive the functionality of the VM cluster 101 and guest VMs 104 thereof. A virtual hypervisor 110 can provide an interface between the VM cluster 101 and a host operating system 112 and allows multiple guest operating systems 130 and associated applications 106 and 108 to run concurrently. The host operating system 112 is responsible for the management and coordination of activities and the sharing of the computer resources of the physical host machine 114. The applications, the guest VMs, and/or the VM cluster are examples of workload that can be relocated from resources (e.g., physical host machines) of one distributed computing system to resources (e.g., physical host machines) of another distributed computing system pursuant to various embodiments disclosed herein.

The physical host machine 114 may include, without limitation, network content servers (e.g., Internet website servers, movie/television programming streaming servers, application program servers), network storage devices (e.g., cloud data storage servers), network data routers, network gateways, communication interfaces, program code processors, data memories, display devices, and/or peripheral devices. The physical host machine 114 may include computer resources such as: processor(s) 116 (e.g., central processing unit, CPU); network interface(s) 118; memory device(s) 120; data mass storage device(s) 122 (e.g., disk drives, solid state nonvolatile memory, etc.); etc. The processor(s) 116 is configured to execute computer program code from the memory device(s) 120, described below as a computer readable storage medium, to perform at least some of the operations disclosed herein.

Besides acting as a host for computing applications 106 and 108 that run on the physical host machine 114, the host operating system 112 may operate at the highest priority level of the resource node 100, executing instructions associated with the physical host machine 114, and it may have exclusive privileged access to the physical host machine 114. The host operating system 112 creates an environment for implementing the VM cluster 101 which hosts the guest VMs 104. One host operating system 112 is capable of implementing multiple independently operating VM clusters 101 simultaneously.

The virtual hypervisor 110 (which may also be known as a virtual machine monitor or VMM) runs on the host operating system 112 and provides an interface between the VM clusters 101 and the physical host machine 114 through the host operating system 112. The virtual hypervisor 110 virtualizes the computer system resources and facilitates the operation of the host guest VMs 104 and associated VM cluster 101. The virtual hypervisor 110 may provide the illusion of operating at a highest priority level to the guest operating system 130. However, the virtual hypervisor 110 can map the guest operating system's priority level to a priority level lower than a top most priority level. As a result, the virtual hypervisor 110 can intercept the guest operating system 130 operations, and execute instructions that require virtualization assistance. Alternatively, the virtual hypervisor 110 may indirectly emulate or directly execute the instructions on behalf of the guest operating system 130. Software steps permitting indirect interaction between the guest operating system 130 and the physical host machine 114 can also be performed by the virtual hypervisor 110.

The VMs 104 present a virtualized environment to the guest operating systems 130, which in turn provide an operating environment for the applications 106 and 108, and other software constructs.

Distributed Computing System

Figure 3:
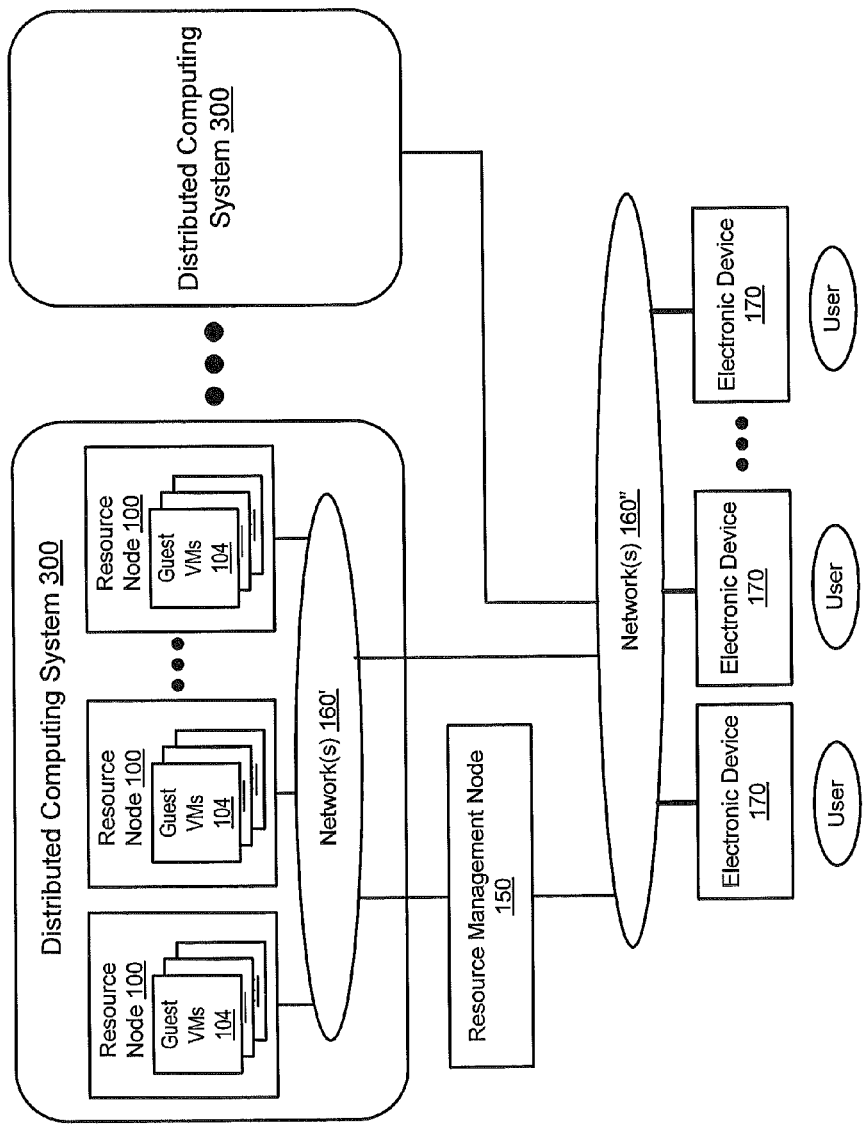
FIG. 3 is a block diagram of a resource management node that manages resources of distributed computing systems according to some embodiments.

FIG. 3 is a resource management node 150 that manages relocation of workload of resources and may further manage relocation of resources of a plurality of distributed computing systems 300 in accordance with some embodiments. Referring to FIG. 3, the distributed computing systems 300 includes a plurality of resource nodes 100 which can include physical host machines hosting a plurality of guest VMs 104. Electronic devices 170, which may be operated by end-users, provide requests through one or more data networks 160'-160" to the distributed computing system 300 for processing by applications hosted by the guest VMs 104 on the physical host machines of resource nodes 100.

The electronic devices 170 may include, but are not limited to, desktop computers, laptop computers, tablet computers, wireless mobile terminals (e.g., smart phones), gaming consoles, networked televisions with on-demand media request capability. The resource nodes 100 may be configured as described herein regarding FIG. 2. For some distributed computing systems 300, the number of resource nodes 100 can number more than a hundred or thousand and the number of electronic devices 170 can number more than a thousand or hundred thousand.

The resource management node 150 or another element of the system may operate to distribute individual requests that are received from the electronic devices 170a-n to particular ones of the resource nodes 100 selected for processing. The resource management node 150 or the other element may select among the resource nodes 100 and/or applications hosted by guest VMs 104 of the resource nodes 100 for distributing individual requests responsive to the present loading of the resource nodes 110 and/or the guest VMs 104. The loading may be determined based on the amount of processing resources, volatile memory resources, non-volatile mass storage resources, communication resources, and/or application resources that are utilized to process the requests. The resource management node 150 where the author element may, for example, operate to distribute the requests responsive to comparison of the relative loading characteristics of the resource nodes 100. The resource management node 150 with other element may attempt to obtain a more balanced loading across the resource nodes 100 to avoid one of the resource nodes 100 operating at more than a threshold loading above other ones of the resource nodes 100.

Using Productive Spend Metrics to Manage Workload and Resources of Distributed Computing Systems The resource management node 150 may collect, combine, and analyze information relating to available resources (e.g., infrastructure resources and/or computational resources), utilization of the resources, costs of the resources, etc. for a plurality of data center facilities and other distributed computer centers in a portfolio.

Figure 4:
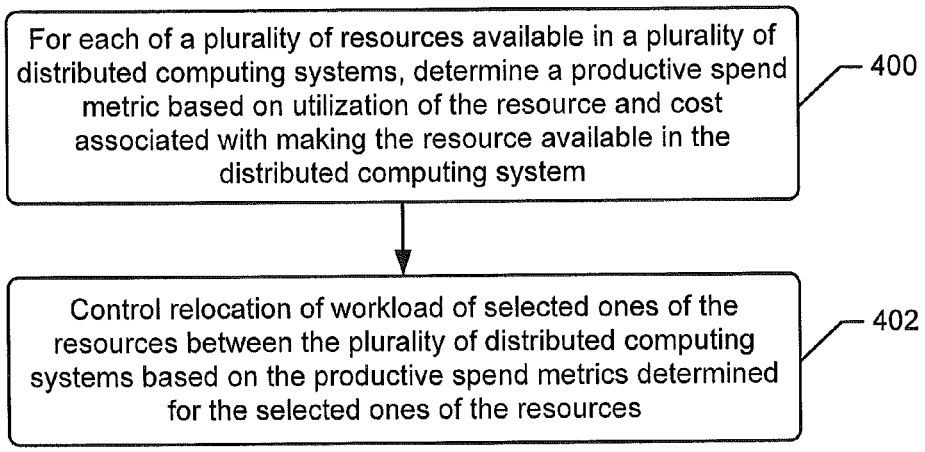
FIGS. 4-7 are flowcharts that illustrate operations for controlling relocation of resources between distributed computing systems and/or adding resources to distributed computing systems based on productive spend metrics determined for the resources, in accordance with some embodiments.

FIG. 4 illustrates operations that may be performed by the resource management node 150 to manage resources of the distributed computing systems 300 in accordance with some embodiments. Referring to FIG. 4, for each of a plurality of resources available in the distributed computing systems 300, the resource management node 150 determines (block 400) a productive spend metric based on utilization of the resource and cost associated with making the resource available in the distributed computing system. The resource management node 150 then controls (block 402) relocation of workload of selected ones of the resources between the plurality of distributed computing systems based on the productive spend metrics determined for the selected ones of the resources.

Figure 5:
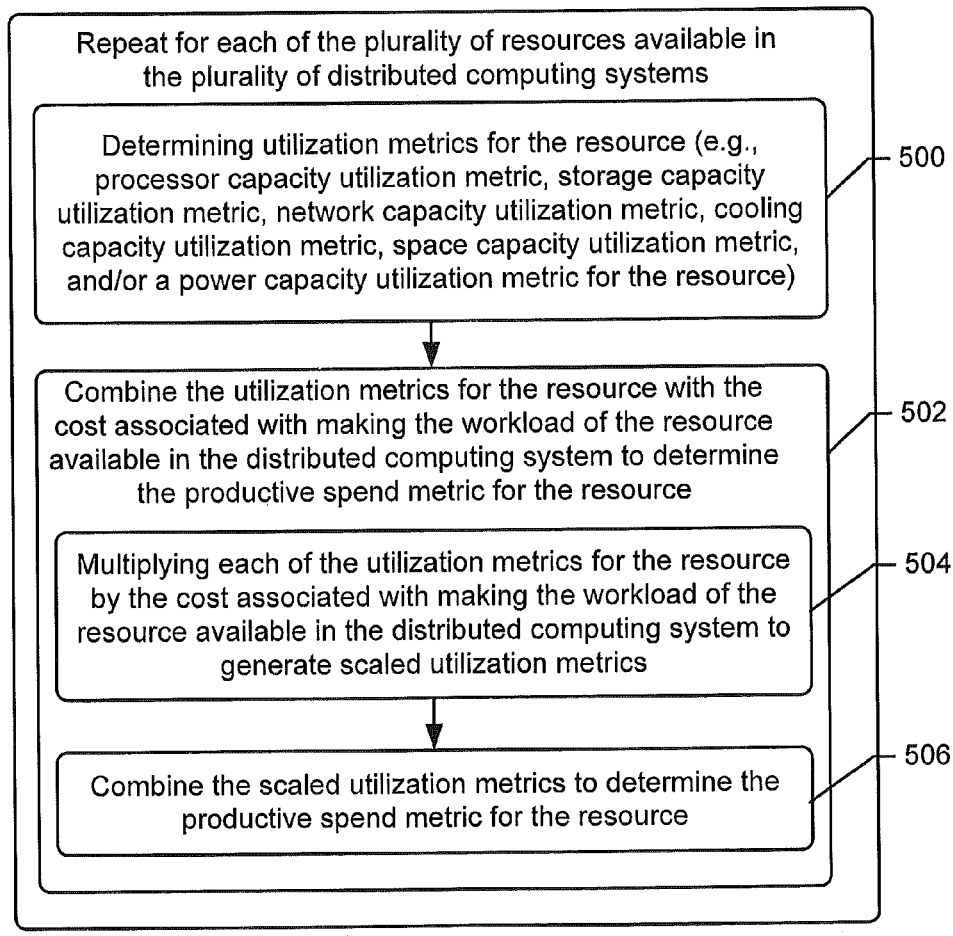

FIG. 5 illustrates operations that may be performed by the resource management node 150 to determine the productive spend metric for each of the resources available in the distributed computing systems 300. Referring to FIG. 5, for each of the plurality of resources available in the distributed computing systems 300, utilization metrics are determined (block 500) for the resource. The utilization metrics for the resource are combined (block 502) with the cost associated with making the workload of the resource available in the distributed computing system 300 to determine the productive spend metric for the resource.

When combining the utilization metrics for the resource with the cost associated with making the workload of the resource available in the distributed computing system to determine the productive spend metric for the resource, the operations may include multiplying (block 504) each of the utilization metrics for the resource by the cost associated with making the workload of the resource available in the distributed computing system 300 to generate scaled utilization metrics. The scaled utilization metrics can then be combined (block 506) to determine the productive spend metric for the resource.

The determination (block 500) of utilization metrics for a resource can include determining any one or more of a cooling capacity utilization metric, a space capacity utilization metric, and a power capacity utilization metric for the resource, which are metrics relating to different infrastructure resources provided by the distributed computing systems 300 to support operation of computing resources such as the physical host machines of resource nodes 100. The determination (block 500) of utilization metrics for a resource can additionally or alternatively include determining any one or more of a processor capacity utilization metric, a storage capacity utilization metric, and a network capacity utilization metric for the resource, which are different computational resources provided by the distributed computing systems 300 to support processing of requests from the electronic devices 170 by, for example, applications hosted on the guest VMs 104 on the physical host machines of resource nodes 100 of the distributed computing systems 300.

As will be explained in further detail below with regard to FIGS. 9-18, a productive spend metric may be determined as a percentage of spend (cost) on utilized capacity of the resources of each of the distributed computing systems in the portfolio. The productive spend metric may be generated based on normalization of each of the resources in a distributed computing system by the associated costs for providing the workload of those resources. Some operations for determining the productive spend metric can include the following formulas:

Compute utilization %=(compute capacity utilized/ total compute capacity)

Which can be generalized as

Resource $A$ utilization %=(resource $A$ capacity utilized/total resource $A$ capacity)

Productive spend for compute=compute utilization %*total cost of compute capacity Which can be generalized as Productive spend for resource $A$=resource $A$ utilization %*total cost of resource $A$ Total productive spend=[(compute utilization %*total cost of compute capacity)+(network utilization %*total cost of network capacity)+(storage utilization %*total cost of storage capacity)+(power utilization %*total cost of power capacity)+(space utilization %*total cost of space capacity)+(cooling utilization %*total cost of cooling capacity)]

Which can be generalized as

Total productive spend=$\Sigma$(resource$_i$ utilization %*total cost of resource$_i$ capacity)

for all resources $i=A \to n$

Productive spend metric=Total productive spend/total spend=[(compute utilization %*total cost of compute capacity)+(network utilization %*total cost of network capacity)+(storage utilization %*total cost of storage capacity)+(power utilization %*total cost of power capacity)+ (space utilization %*total cost of space capacity)+(cooling utilization %*total cost of cooling capacity)]/[total cost of compute capacity+total cost of network capacity+total cost of storage capacity+total cost of power capacity+total cost of space capacity+total cost of cooling capacity]

The productive spend metric is therefore determined based on a combination of resource metrics. In the example formula, the productive spend metrics is determined based on a combination of productive compute utilization (e.g., processor utilization by a resource), compute capacity (e.g., total processor bandwidth), cost associated with providing the compute resource, network utilization (e.g., network bandwidth utilization by a resource), network capacity (e.g., total network bandwidth), cost associated with providing the network resource, power utilization by a resource, power capacity (e.g., maximum power supply output capacity), cost associated with providing the power resource, storage utilization (e.g., data storage space used by the resource), space utilization (e.g., rack space used by the resource), space capacity (e.g., total rack space provided in a cabinet or within a distributed computing system facility), cost associated with providing the space resource, cooling utilization (e.g., amount of cooling needed to cool the resource during operation), cooling capacity (e.g., total amount of cooling provided by a cooling resource), and cost associated with providing the cooling resource.

Determining physical rack space capacity, electrical power capacity, cooling capacity, processor bandwidth, network bandwidth, storage space, and other resource metrics can be based on relationships to defined types of resources that are defined or observed to be used. The resource metrics may be specified by manufacturers and/or operators, calculated, and/or developed by data collection processes that can include monitoring effects that different observed guest VM loading and/or physical host machine loading have on the resources requirements of a distributed computing system, such as the electrical power consumption, cooling metrics, and/or physical rack storage space. A Data Center Infrastructure Management (DCIM) tool by CA Technologies may be used to provide information used for these relationships.

The productive spend metrics can be computed for resources of each of the distributed computing systems 300 in the portfolio, and can be compared between the distributed computing systems 300 to programmatically facilitate decision making regarding the relocation and/or deployment of resources and/or workload among the distributed computing systems 300 in the portfolio.

The productive spend metrics can be repetitively determined over time (e.g., periodically or based on occurrence of defined events) to control relocation of resources based on changes occurring in utilization metrics of resources in one or more tracked distributed computing systems 300. Weighting values may be used to adjust the contribution that different ones of the utilization metrics of a resource has toward the determination of the productive spend metrics. The weighting values can be adjusted over time based on observations made by the resource management node 150 as to the memory utilization metrics and costs associated with resources that have been selected for relocation. In this manner, the weighting values can be dynamically tuned based on workload and/or resource relocation choices made by a human operator and/or by the resource management node 150 based on the observable memory utilization metrics and costs associated with the resource. The relative importance of the different utilization metrics may thereby be tuned by feedback learned from relocation decisions.

In one embodiment, the resource management node 150 operates to repeat over time the determining of the productive spend metrics and the controlling relocation of workload of resources between the plurality of distributed computing systems 300 based on the productive spend metrics.

The resource management node 150 records in a memory the utilization metrics for ones of the resources that are selected for their workload to be relocated and costs associated with ones of the resources that are selected for their workload to be relocated. Weighting values are adjusted based on the memory utilization metrics recorded in the memory and the costs recorded in the memory for the ones of the resources that are selected for their workload to be relocated. For at least some of the repetitions, and for each of a plurality of resources available in one of the plurality of distributed computing systems, the productive spend metric is generated based on combining different ones of the weighting values with different ones of the utilization metrics for the resource and with the cost associated with making the workload of the resource available in the one of the plurality of distributed computing systems. Relocation of workload of selected ones of the resources away from the one of the plurality of distributed computing systems is controlled based on the productive spend metrics.

Some operations for determining the productive spend metric using variable weighting values (W1 . . . WN), which are determined as disclosed herein, can include the following formula:

$$\text{Productive spend metric} = [((\text{compute utilization \%} * \text{total cost of compute capacity}) * W1) + \\
((\text{network utilization \%} * \text{total cost of network capacity}) * W2) + ((\text{storage utilization \%} * \text{total cost of storage capacity}) * W3) + ((\text{power utilization \%} * \text{total cost of power capacity}) * W4) + \\
((\text{space utilization \%} * \text{total cost of space capacity}) * W5) + ((\text{cooling utilization \%} * \text{total cost of cooling capacity}) * W6)] / [\text{total cost of compute capacity} + \text{total cost of network capacity} + \text{total cost of storage capacity} + \text{total cost of power capacity} + \text{total cost of space capacity} + \text{total cost of cooling capacity}]$$

In the above formula, the variable weighting values (W1 . . . W6) can be adjusted based on the memory utilization metrics recorded in the memory and the costs recorded in the memory for the ones of the resources that observed over time as having been selected to be relocated. The weighting values may additionally or alternatively be defined based on a relative importance of the different associated utilization metrics to the determination of the productive spend metric for a resource.

The utilization metrics can include any one or more of a processor capacity utilization metric, a storage capacity utilization metric, a network capacity utilization metric, a cooling capacity utilization metric, a space capacity utilization metric, and a power capacity utilization metric.

Figure 6:
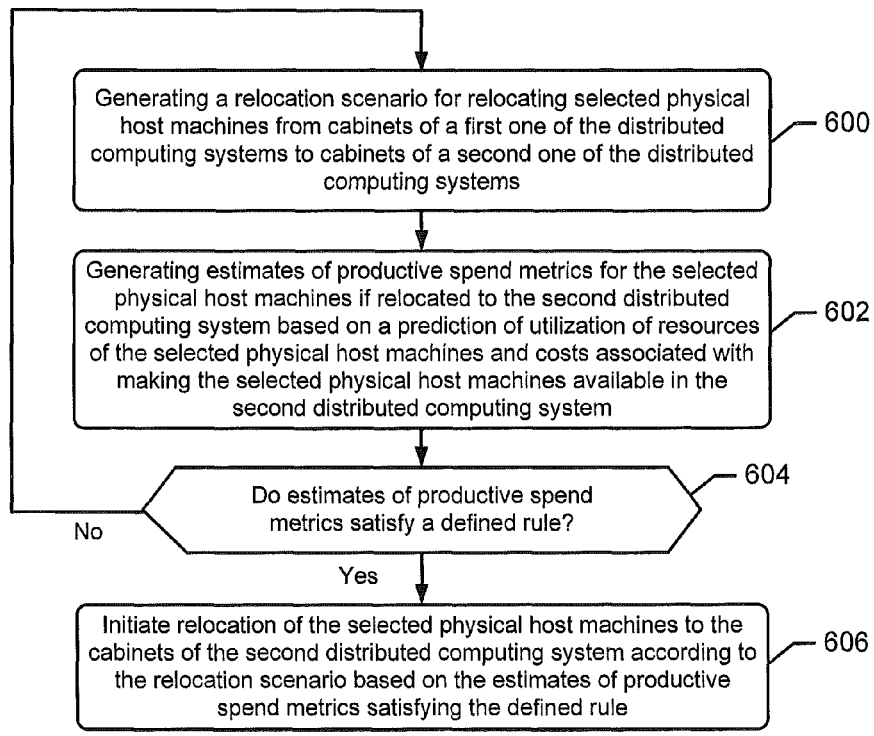

Generating Relocation Scenarios for Relocating Physical Host Machines or Other Resources Between Distributed Computing Systems FIG. 6 is a flowchart that illustrates operations by the resource management node 150 for controlling relocation of resources between distributed computing systems, according to some embodiments. Referring to FIG. 6, the resource management node 150 generates (block 600) a relocation scenario for relocating selected physical host machines (or other physical or virtual resources) from cabinets of a first one of the distributed computing systems to cabinets of a second one of the distributed computing systems. The node 150 generates (block 602) estimates of productive spend metrics for the selected physical host machines if relocated to the second distributed computing system based on a prediction of utilization of resources of the selected physical host machines and costs associated with making the selected physical host machines available in the second distributed computing system. A determination (block 604) is made whether the estimates of productive spend metrics satisfy a defined rule and, if so, the node 150 initiates (block 606) relocation of the selected physical host machines to the cabinets of the second distributed computing system according to the relocation scenario.

Non-limiting examples of a defined rule can include a need for the productive spend metrics to satisfy a defined minimum productive spend level, a defined minimum resource productive spend, and/or a minimum resource utilization. Other defined rules may relate to providing a defined tier level for the distributed computer system, a geographic location of the distributed computer system, etc.

The resource management node 150 may recursively generate and evaluate relocation scenarios to identify a relocation scenario that satisfies a defined rule. For example the resource management node 150 may recursively generate different relocation scenarios for relocating selected physical host machines from cabinets of the first distributed computing system to cabinets of the second distributed computing system, generate estimates of productive spend metrics for the selected physical host machines if relocated to the second distributed computing system, and determine whether the estimates of productive spend metrics satisfy the defined rule until the defined rule is satisfied.

To initiate relocation of the selected physical host machines to the cabinets of the second distributed computing system based on the estimates of productive spend metrics satisfying the defined rule, the resource management node 150 may generate a work order including information identifying physical storage locations in the cabinets of the second distributed computing system for installation of the selected physical host machines.

Based on detecting that the selected physical host machines have been installed in the cabinets of the second distributed computing system and become available to receive guest virtual machines (VMs) for hosting, the resource management node 150 may initiate loading of the guest VMs on the selected physical host machines responsive to the detecting.

Accordingly, when an acceptable relocation scenario is identified, the relocation scenario can be communicated to a work order generation tool to generate a work order that lists, for example, physical host machines or other resources to be installed or relocated to defined locations in the cabinets and lists guest VMs to be installed or relocated to defined physical host machines. The work order may be physically carried out by a human operator and/or may be at least partially carried out by automated computer processes to install and/or relocate guest VMs and/or to shut-down physical host machines.

Figure 7:
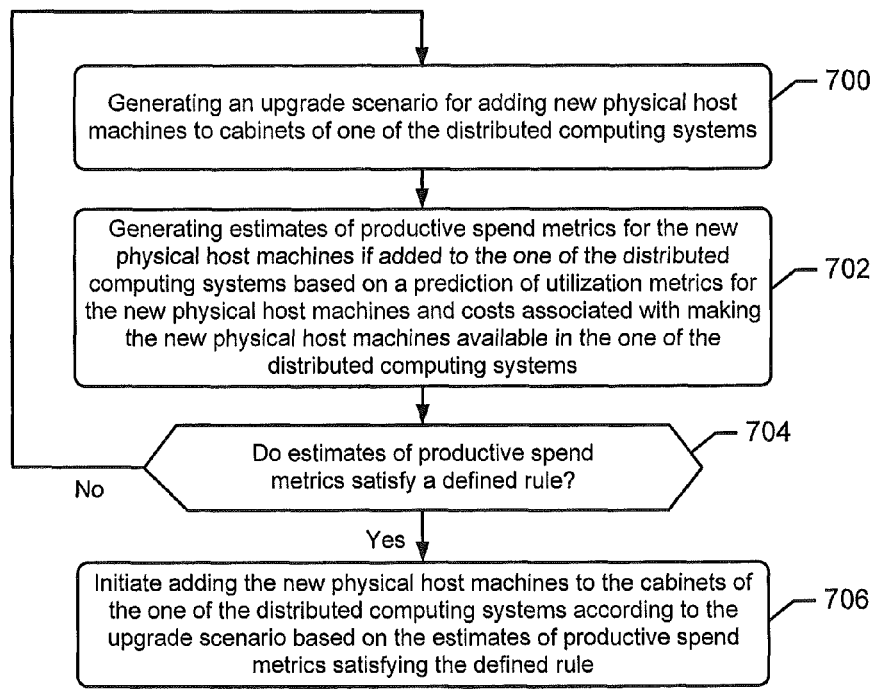

Generating Upgrade Scenarios for Adding Physical Host Machines or Other Resources to a Distributed Computing System FIG. 7 is a flowchart that illustrates operations by the resource management node 150 for controlling deployment of resources to a distributed computing system, according to some embodiments. Referring to FIG. 7, the resource management node 150 generates (block 700) an upgrade scenario for adding new physical host machines or other resources (e.g., physical or virtual resources) to cabinets of one of the distributed computing systems 300. The node 150 generates (block 702) estimates of productive spend metrics for the new physical host machines if added to the one of the distributed computing systems 300 based on a prediction of utilization metrics for the new physical host machines and costs associated with making the new physical host machines available in the one of the distributed computing systems 300. A determination (block 704) is made whether the estimates of productive spend metrics satisfy a defined rule and, if so, the node 150 initiates (block 706) adding (deployment) of the new physical host machines to the cabinets of the one of the distributed computing systems 300 according to the upgrade scenario.

The resource management node 150 may recursively generate and evaluate upgrade scenarios to identify an upgrade scenario that satisfies a defined rule. For example the resource management node 150 may recursively generate different upgrade scenarios for adding new physical host machines to cabinets of the one of the distributed computing systems 300, generate estimates of productive spend metrics for the new physical host machines if added to the one of the distributed computing systems 300, and determine whether the estimates of productive spend metrics satisfy the defined rule until the defined rule is satisfied.

Resource Management Node Configuration

Figure 8:
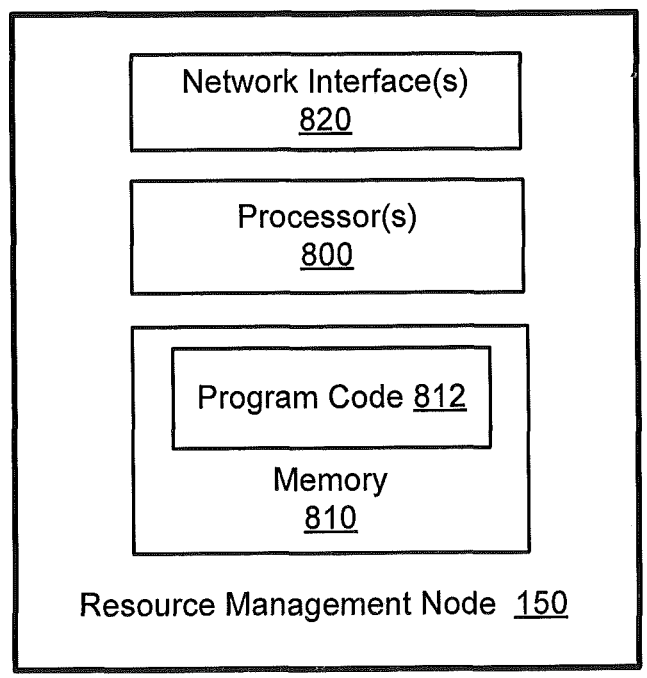
FIG. 8 is a resource management node that is configured according to some embodiments.

FIG. 8 is a block diagram of a resource management node 150 that is configured to perform the operations of one of more of the embodiments disclosed herein. The resource management node 150 can include one or more network interfaces 820, one or more processors 800 (referred to as "processor" for brevity), and one or more memories 810 (referred to as "memory" for brevity) containing program code 812.

The processor 800 may include one or more data processing circuits, such as a general purpose and/or special purpose processor (e.g., microprocessor and/or digital signal processor) that may be collocated or distributed across one or more networks. The processor 800 is configured to execute program code 812 in the memory 810, described below as a computer readable medium, to perform some or all of the operations for one or more of the embodiments disclosed herein.

Example Utilization Metrics and Use of Productive Spend Metrics

As explained above, a system in accordance with various embodiments disclosed herein collects, combines, and analyzes information relating to available infrastructure resources, utilization of the infrastructure resources, costs of the infrastructure resources, etc for a plurality of data center facilities and other distributed computing centers in a portfolio. Various example utilization metrics for resources provided by distributed computing systems and operations that can be performed for displaying and comparing productive spend metrics determined are illustrated explained below with regard to FIGS. 9-18.

Figure 9:
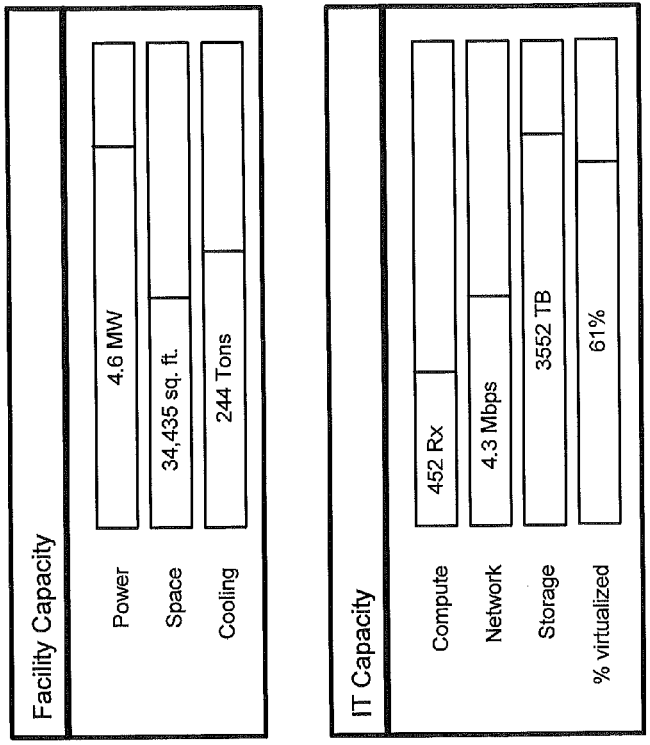

Referring to FIG. 9, the system has collected information that includes a list of resources and associated resource metrics that include resource utilization, available resource capacity, and resource costs for a data center facility location. The resources include a power system, cabinet space (e.g., rack space), cooling system, compute processing devices (e.g., resource score Rx), network communication devices (e.g., Mbps), data storage devices (TB), % virtualized (e.g., virtual machines hosted on physical host machines), etc. The resource score Rx is generated as a measure of computer code processing power of an IT system device, such as a server. The resource score Rx can be determined based on components of the device that provide and affect the processing power, such as the number of central processing units (CPU), number of processing cores in each CPU, clock rate of the processing cores, processor to memory bus rate, memory access rate, operating system characteristics, etc. Capacity of the facility is monitored and displayed, efficiency of the facility is monitored and displayed, providers of power and communications are listed, information technology (IT) systems provided within the facility are listed. The total capacity and present utilization of power, space, and cooling are determined and displayed in graphs. The total capacity and present utilization of compute processing, network bandwidth, data storage, and percent virtualization are determined and displayed in graphs.

Referring to FIG. 10, the system has similarly determined and displayed information for other data center facilities in the portfolio. The data centers are geographically dispersed and some are owned by the same enterprise entity, some others use resources that are leased from a colocation (COLO) provider, and one is a leased cloud-based facility (e.g., Amazon Web Services). In accordance with some embodiments, productive spend values have been determined for the different data center facilities to allow relative comparison between the data center facilities of their resource utilization normalized by the cost of providing this resources. Decisions can thereby be made as to whether data center facility should be consolidated, upgraded, or other actions be taken.

Figure 11:
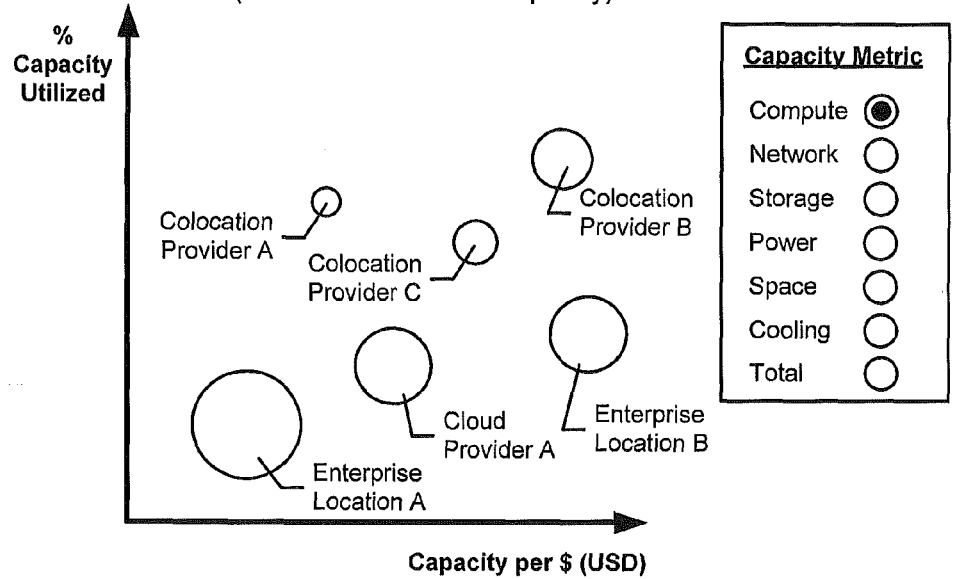
FIG. 11 graphically illustrates infrastructure capacity and utilization determined for a portfolio of distributed computing systems at different geographic locations in accordance with some embodiments.

FIG. 11 illustrates a graph of the infrastructure capacity utilization of six different data center facilities located at geographically dispersed locations. The present compute resource utilization and relative cost of providing compute resources of each of the different data center facilities are displayed. An operator can select to have corresponding computations performed for network resources, storage resources, power supply resources, space resources, and cooling resources for each of the data center facilities.

Figure 12:
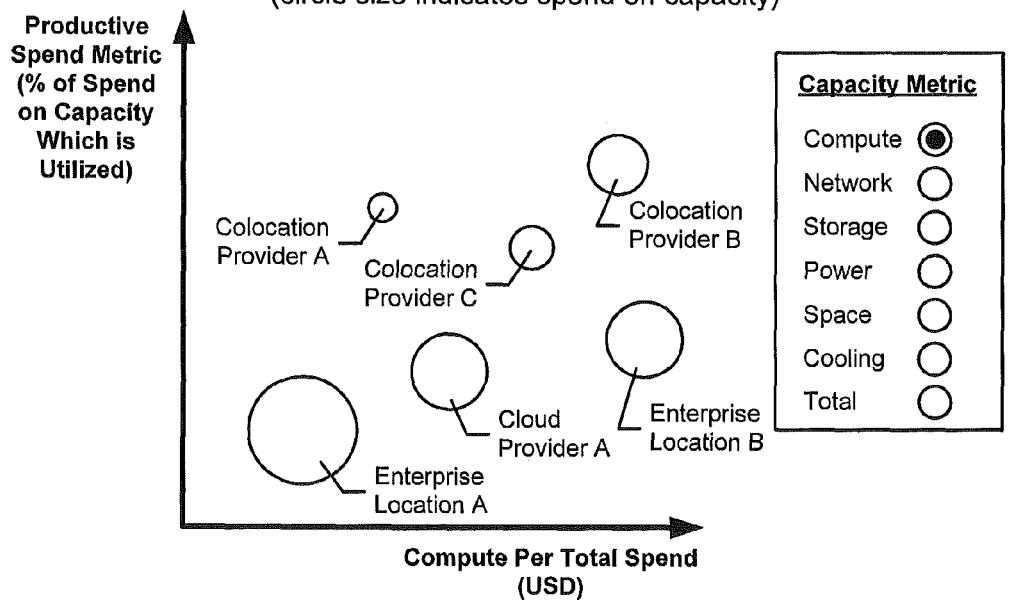
FIG. 12 graphically illustrates infrastructure productive spend determined for a portfolio of distributed computing systems at different geographic locations in accordance with some embodiments.

FIG. 12 illustrates a graph of the infrastructure productive spend is been computed for each of the six different data center facilities. The present percent spend on compute resource capacity versus cost of providing the compute resource in each of the data center facilities is displayed. An operator can select to have corresponding computations performed for network resources, storage resources, power supply resources, space resources, cooling resources, and total resources for each of the data center facilities.

The example graphs allow comparison of the percentage of resource capacities utilized and capacity per cost for each of the data center facilities in a portfolio. Workload can be deployed or relocated among the data center facilities to preferably obtain a greater capacity per cost and percentage resource capacity utilization.

FIG. 13 illustrates a table of containing a productive spend metric, determined as a percentage of spend (cost) on utilized capacity, for one of the data center facilities in the portfolio. In general, the productive spend metric can be generated based on normalization of each of the infrastructure resources in a data center facility by the associated cost for providing those infrastructure resources. In the particular non-limiting example of FIG. 13, the productive spend metric is determined based on the following formulas:

$$\text{Compute utilization \%} = (\text{compute capacity utilized}/\text{total compute capacity})$$

Which can be generalized as $$\text{Resource } A \text{ utilization \%} = (\text{resource } A \text{ capacity utilized}/\text{total resource } A \text{ capacity})$$

$$\text{Productive spend for compute} = \text{compute utilization \%} \ast \text{total cost of compute capacity}$$

Which can be generalized as

> Productive spend for resource $A$ = resource $A$ utilization %*total cost of resource $A$ > Total productive spend=[(compute utilization %*total cost of compute capacity)+(network utilization %*total cost of network capacity)+(storage utilization %*total cost of storage capacity)+(power utilization %*total cost of power capacity)+(space utilization %*total cost of space capacity)+(cooling utilization %*total cost of cooling capacity)]

Which can be generalized as

> Total productive spend=$\Sigma$(resource$_i$ utilization %*total cost of resource$_i$ capacity)
>
> for all resources $i = A \rightarrow n$ > Productive spend metric=Total productive spend/total spend=[(compute utilization %*total cost of compute capacity)+(network utilization %*total cost of network capacity)+(storage utilization %*total cost of storage capacity)+(power utilization %*total cost of power capacity)+(space utilization %*total cost of space capacity)+(cooling utilization %*total cost of cooling capacity)]/[total cost of compute capacity+total cost of network capacity+total cost of storage capacity+total cost of power capacity+total cost of space capacity+total cost of cooling capacity]

The productive spend metric represents the percentage of the spend (cost) on capacity which is utilized, and resulted in a value of 41% ($3.3 M/$8 M) based on the example values shown in FIG. 13.

Productive spend metrics can be similarly computed for the other data center facilities in the portfolio, and can be compared between the data center facilities to simplify decision making regarding the deployment or relocation of resources and/or workload among the data center facilities in the portfolio.

Figure 14:
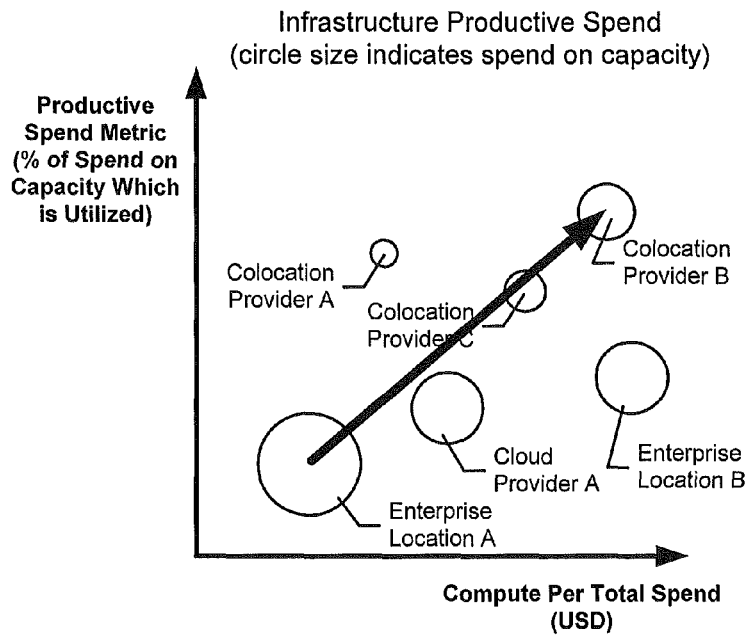
FIG. 14 graphically illustrates a relocation scenario, for relocating resources from a distributed computing system owned by one entity (enterprise) to a colocation distributed computing system owned by another entity, that is programmatically evaluated based on its effect on productive spend of the distributed computing systems in accordance with some embodiments.

FIG. 14 illustrates a relocation scenario generated based on the productive spend metrics of the data center facilities. The relocation strategy would relocate resources and associated workload from an enterprise data center at location A to a leased colocation facility with Provider B to obtain an improved productive spend metric (e.g., increased compute per total spend and % of spend on utilized capacity).

Figure 15:
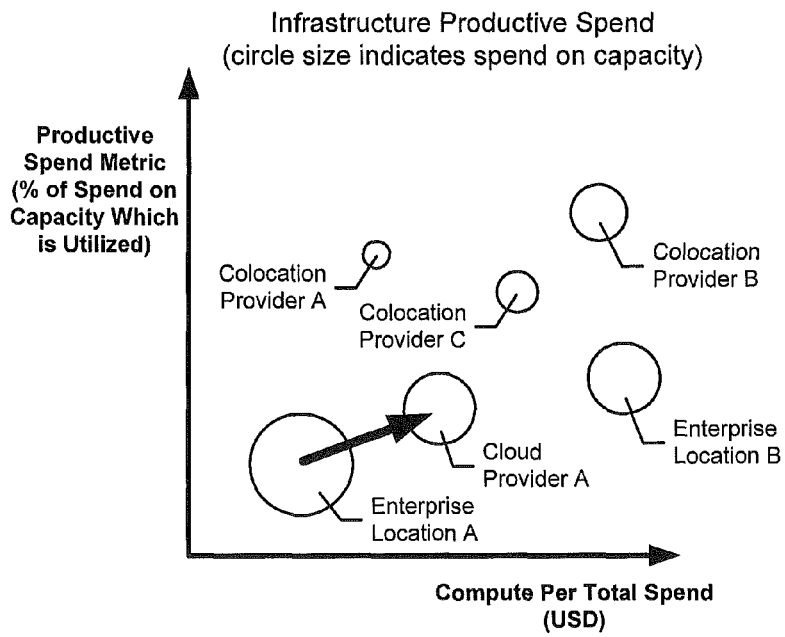
FIG. 15 graphically illustrates a relocation scenario, for relocating resources from a distributed computing system owned by one entity (enterprise) to a cloud-based distributed computing system owned by another entity, that is programmatically evaluated based on its effect on productive spend of the distributed computing systems in accordance with some embodiments.

FIG. 15 illustrates another relocation strategy generated based on the productive spend metrics of the data center facilities. The relocation strategy would relocate resources and associated workload from an enterprise data center at location A to a cloud facility with Provider A to obtain an improved productive spend metric (e.g., increased compute per total spend and % of spend on utilized capacity).

Figure 16:
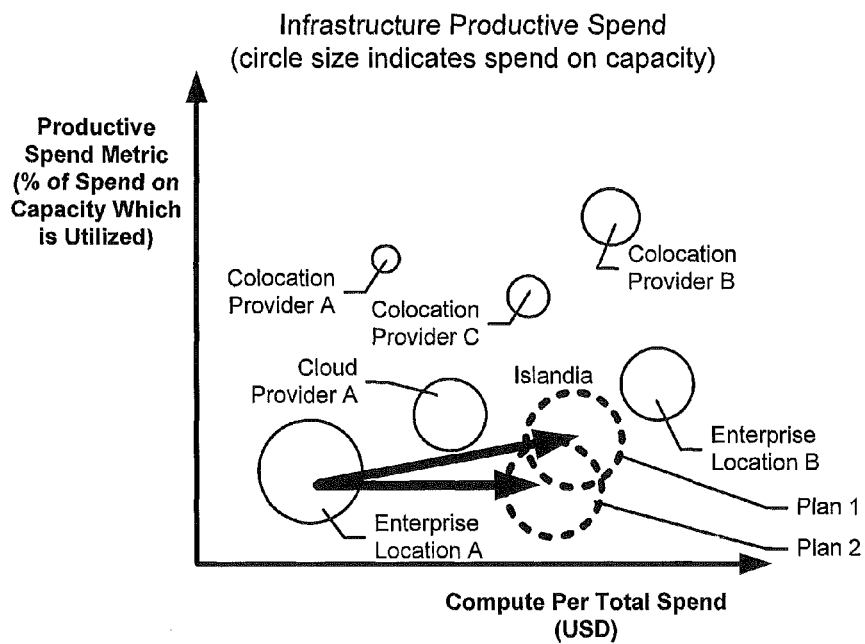
FIGS. 16 and 17 graphically illustrates upgrade scenarios, including adding new physical host machines to a distributed computing system, that is programmatically evaluated based on its effect on productive spend of the distributed computing system in accordance with some embodiments.

FIG. 16 illustrates an upgrade strategy generated based on the productive spend metrics of the data center facilities. The upgrade strategy would increase efficiency of the enterprise data center at location A by retrofitting, upgrading, and/or optimizing its resources and/or by obtaining cost reductions at the data center facility. The upgrade strategy would provide an estimated improvement in the productive spend metric of that data center facility (e.g., increased compute per total spend and % of spend on utilized capacity).

Figure 17:
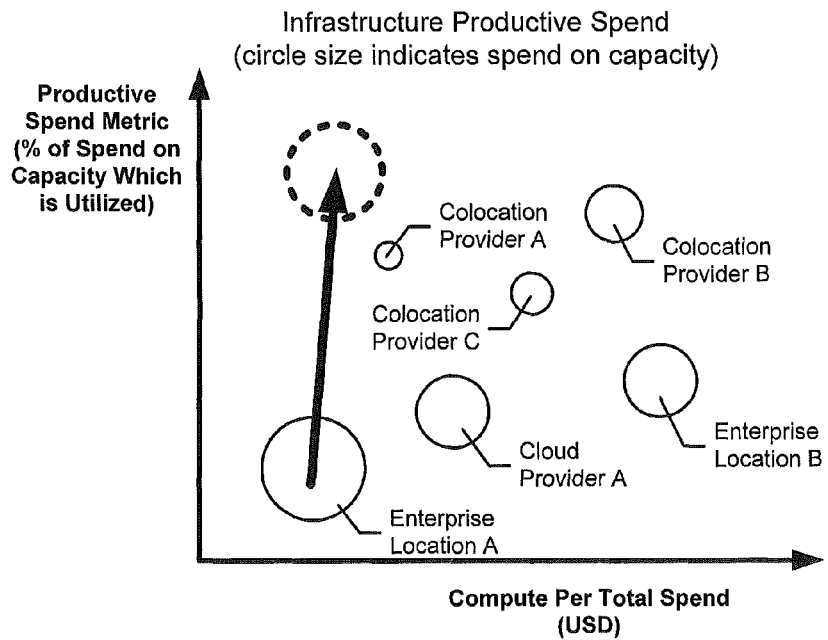

FIG. 17 illustrates another upgrade strategy generated based on the productive spend metrics of the data center facilities. The upgrade strategy would add resources to the enterprise data center at location A to increase its efficiency and provide an improved productive spend metric (e.g., increased compute per total spend and % of spend on utilized capacity).

Figure 18:
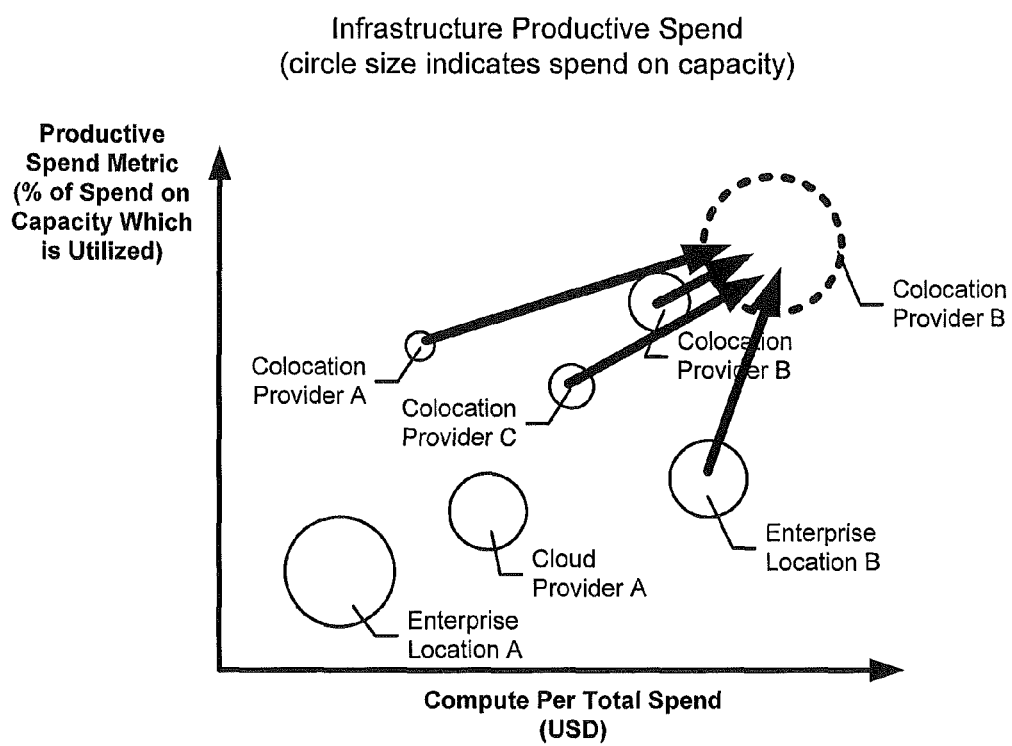
FIG. 18 graphically illustrates a relocation scenario, for consolidating distributed computing systems, that is programmatically evaluated based on its effect on productive spend of the effected distributed computing systems in accordance with some embodiments.

FIG. 18 illustrates another relocation strategy generated based on the productive spend metrics of the data center facilities. The relocation strategy would consolidate a plurality of the data center facilities into a single data center facilities provided by a leased colocation provider to obtain an improved productive spend metric (e.g., increased compute per total spend and % of spend on utilized capacity).

Determining and graphically illustrating relocation and upgrade strategies in this manner can enable an operator to intuitively analyze and compare the productive spend metrics associated with a plurality of data center facilities within a portfolio. Operators may thereby more easily and accurately determine when one or more of the strategies is acceptable, which can then be selected to initiate implementation.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit" "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) of a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of operating a resource management node comprising:

for each of a plurality of resources available in a plurality of distributed computing systems, determining a productive spend metric based on utilization of the resource and cost associated with making the resource available in the distributed computing system, wherein respective ones of the plurality of distributed computing systems each comprise a plurality of physical host machines, respective ones of the plurality of physical host machines hosting a plurality of guest virtual machines;

comparing, for selected ones of the resources, first productive spend metrics of a first distributed computing system of the plurality of distributed computing systems to second productive spend metrics for a second distributed computing system of the plurality of distributed computing systems;

controlling relocation of workload of the selected ones of the resources from the first distributed computing system of the plurality of distributed computing systems to the second distributed computing system of the plurality of distributed computing systems based on the comparison of the first and second productive spend metrics determined for selected ones of the resources;

generating a relocation scenario for relocating selected physical host machines from cabinets of the first distributed computing system of the plurality of distributed computing systems to cabinets of the second computing system of the plurality of distributed computing systems;

generating estimates of productive spend metrics for the selected physical host machines if relocated to the second distributed computing system based on a prediction of utilization of resources of the selected physical host machines and costs associated with making the selected physical host machines available in the second distributed system;

determining whether the estimates of productive spend metrics for the selected physical host machines satisfy defined rule; and initiating relocation of the selected physical host machines to the cabinets of the second distributed computing system according to the relocation scenario based on estimates of productive spend metrics satisfying the defined rule;

generating an upgrade scenario for adding new physical host machines to cabinets of the second distributed computing system of the plurality of distributed computing system;

generating estimates of productive spend metrics for the new physical host machines if added to the second distributed computing system of the plurality of distributed computing systems based on a prediction of utilization metrics for the new physical host machines and costs associated with making the new physical host machines available in the second distributed computing system of the plurality of distributed computing systems;

determining whether the estimates of productive spend metrics for the new physical host machines satisfy a defined rule for adding new physical host machines; and initiating adding the new physical host machines to the cabinets of the second distributed computing system of the plurality of distributed computing system according to the upgrade scenario based on the estimated of productive spend metrics satisfying the defined rule for adding new physical host machines.

2. The method of claim 1, wherein, for each of the plurality of resources available in the plurality of distributed computing systems, determining the productive spend metric based on utilization of the resource and cost associated with making workload of the resource available in the distributed computing system, comprises:

for each of the plurality of resources available in the plurality of distributed computing systems,
determining utilization metrics for the resource; and
combining the utilization metrics for the resource with the cost associated with making the workload of the resource available in the distributed computing system to determine the productive spend metric for the resource.

3. The method of claim 2, wherein combining the utilization metrics for the resource with the cost associated with making the workload of the resource available in the distributed computing system to determine the productive spend metric for the resource comprises:

multiplying each of the utilization metrics for the resource by the cost associated with making the metric for the workload of the resource available in the distributed computing system to generate scaled utilization metrics; and combining the scaled utilization metrics to determine the productive spend metric for the resource.

4. The method of claim 2, wherein determining utilization metrics for the resource comprises:

determining a processor capacity utilization metric, a storage capacity utilization metric, and a network capacity utilization metric for the resource.

5. The method of claim 2, wherein determining utilization metrics for the resource comprises:

determining a cooling capacity utilization metric, a space capacity utilization metric, and a power capacity utilization metric for the resource.

6. The method of claim 1, further comprising:

recursively generating different relocation scenarios for relocating selected physical host machines from cabinets of the first distributed computing system to cabinets of the second distributed computing system, generating estimates of productive spend metrics for the selected physical host machines if relocated to the second distributed computing system, and determining whether the estimates of productive spend metrics for the selected physical host machines satisfy the defined rule until the defined rule is satisfied.

7. The method of claim 1, wherein initiating relocation of the selected physical host machines to the cabinets of the second distributed computing system based on the estimates of productive spend metrics satisfying the defined rule, comprises:

generating a work order comprising information identifying physical storage locations in the cabinets of the second distributed computing system for installation of the selected physical host machines.

8. The method of claim 7, further comprising:

detecting that the selected physical host machines have been installed in the cabinets of the second distributed computing system and become available to receive guest virtual machines (VMs) for hosting; and initiating loading of the guest VMs on the selected physical host machines responsive to the detecting.

9. The method of claim 1, further comprising: recursively generating different relocation scenarios for adding new physical host machines to cabinets of the respective ones of the plurality of first distributed computing systems, generating estimates of productive spend metrics for the new physical host machines if added to the respective ones of the plurality of distributed computing systems, and determining whether the estimates of productive spend metrics satisfy the defined rule for adding new physicals host machines until the defined rule for adding new physical host machines is satisfied.

10. The method of claim 1, wherein the first distributed computing system and the second distributed computing system are located at different geographic locations from one another.

11. The method of claim 1, wherein a first productive spend metric for a first workload in the first distributed computing system is different from a second productive spend metric for the first workload in the second distributed computing system.

12. A method of operating a resource management node comprising:
- for each of a plurality of resources available in a plurality of distributed computing systems, determining a productive spend metric based on utilization of the resource and cost associated with making the resource available in the distributed computing system,
  - wherein respective ones of the plurality of distributed computing systems each comprise a plurality of physical host machines, respective ones of the plurality of physical host machines hosting a plurality of guest virtual machines;
- comparing, for selected ones of the resources, first productive spend metrics of a first distributed computing system of the plurality of distributed computing systems to second productive spend metrics for a second distributed computing system of the plurality of distributed computing systems;
- controlling relocation of workload of the selected ones of the resources from the first distributed computing system of the plurality of distributed computing systems to the second distributed computing system of the plurality of distributed computing systems based on the comparison of the first and second productive spend metrics determined for the selected ones of the resources;
- repeating over time the determining of the productive spend metrics and the controlling relocation of workload of selected ones of the resources between the plurality of distributed computing systems based on the productive spend metrics;
- recording in a memory, utilization metrics for ones of the resources that are selected for their workload to be relocated and costs associated with ones of the resources that are selected for their workload to be relocated;
- adjusting weighting values based on the utilization metrics recorded in the memory and the costs recorded in the memory for the ones of the resources that are selected for their workload to be relocated;
- for at least some of the repetitions,
  - for each of a plurality of resources available in the first distributed computing system of the plurality of distributed computing systems, generating the productive spend metric based on combining different ones of the weighting values with different ones of the utilization metrics for the resource and with the cost associated with making the workload of the resource available in the first distributed computing system of the plurality of distributed computing systems; and
  - controlling relocation of the workload of selected ones of the resources away from the first distributed computing system of the plurality of distributed computing systems to the second distributed computing system of the plurality of distributed computing systems based on the productive spend metrics.

13. A computer program product comprising:
- a non-transitory computer readable storage medium having computer readable program code embodied in the medium, the computer readable program code comprising: computer readable code, for each of a plurality of resources available in a plurality of distributed computing systems, determining a productive spend metric based on utilization of the resource and cost associated with making the resource available in the distributed computing system, wherein respective ones of the plurality of distributed computing systems each comprise a plurality of physical host machines, respective ones of the plurality of physical host machines hosting a plurality of guest virtual machines;
- computer readable code to compare, for selected ones of the resources, first productive spend metrics of a first distributed computing system of the plurality of distributed computing systems to second productive spend metrics for a second distributed computing system of the plurality of distributed computing systems;
- computer readable code to control relocation of workload of the selected ones of the resources from the first distributed computing system of the plurality of distributed computing systems to the second distributed computing system of the plurality of distributed computing systems based on the comparison of the first and second productive spend metrics determined for selected ones of the resources;
- wherein the computer readable code to control relocation of selected ones of the resources between the distributed computing systems based on the productive spend metrics comprises:
- computer readable code to generate a relocation scenario for relocating selected physical host machines from cabinets of the first distributed computing system of the plurality of distributed computing systems to cabinets of the second computing system of the plurality of distributed computing systems;
- computer readable code to generate estimates of productive spend metrics for the selected physical host machines if relocated to the second distributed computing system based on a prediction of utilization of resources of the selected physical host machines and costs associated with making the selected physical host machines available in the second distributed system;
- computer readable code to determine whether the estimates of productive spend metrics for the selected physical host machines satisfy defined rule; and
- computer readable code to initiate relocation of the selected physical host machines to the cabinets of the second distributed computing system according to the relocation scenario based on estimates of productive spend metrics satisfying the defined rule;
- computer readable code to generate an upgrade scenario for adding new physical host machines to cabinets of the second distributed computing system of the plurality of distributed computing system,
- computer readable code to generate estimates of productive spend metrics for the new physical host machines if added to the second distributed computing system of the plurality of distributed computing systems based on a prediction of utilization metrics for the new physical host machines and costs associated with making the new physical host machines available in the second distributed computing system of the plurality of distributed computing systems;
- computer readable code to determine whether the estimates of productive spend metrics for the new physical host machines satisfy a defined rule for adding new physical host machines; and computer readable code to initiate adding the new physical host machines to the cabinets of the second distributed computing system of the plurality of distributed computing system according to the upgrade scenario based on the estimated of productive spend metrics satisfying the defined rule for adding new physical host machines.

14. The computer program product of claim 13, further comprising:
computer readable code to, for each of the plurality of resources available in the plurality of distributed computing systems,
determine utilization metrics for the resource; and
combine the utilization metrics for the resource with the cost associated with making the workload of the resource available in the distributed computing system to determine the productive spend metric for the resource.

15. The computer program product of claim 14, wherein computer readable code to combine the utilization metrics for the resource with the cost associated with making the resource available in the distributed computing system to determine the productive spend metric for the resource, comprises:
computer readable code to multiply each of the utilization metrics for the resource by the cost associated with making the metric for the workload of the resource available in the distributed computing system to generate scaled utilization metrics; and
computer readable code to combine the scaled utilization metrics to determine the productive spend metric for the resource.

16. The computer program product of claim 13, further comprising:
computer readable code to repeat over time the determining of the productive spend metrics and the controlling relocation of workload of selected ones of the resources between the plurality of distributed computing systems based on the productive spend metrics;
computer readable code to record in a memory, utilization metrics for ones of the resources that are selected for their workload to be relocated and costs associated with ones of the resources that are selected for their workload to be relocated;
computer readable code to adjust weighting values based on the utilization metrics recorded in the memory and the costs recorded in the memory for the ones of the resources that are selected for their workload to be relocated;
computer readable code to, for at least some of the repetitions,
for each of a plurality of resources available in the first distributed computing system of the plurality of distributed computing systems, generating the productive spend metric based on combining different ones of the weighting values with different ones of the utilization metrics for the resource and with the cost associated with making the workload of the resource available in the first distributed computing system of the plurality of distributed computing systems; and
computer readable code to control relocation of the workload of selected ones of the resources away from the first distributed computing system of the plurality of distributed computing systems to the second distributed computing system of the plurality of distributed computing systems based on the productive spend metrics.

17. A method of operating a resource management node comprising:
for each of a plurality of resources available in a plurality of distributed computing systems, determining a productive spend metric based on utilization of the resource and cost associated with making the resource available in the distributed computing system,
wherein respective ones of the plurality of distributed computing systems are geographically dispersed and each comprise a plurality of physical host machines, respective ones of the plurality of physical host machines hosting a plurality of guest virtual machines;
comparing, for selected ones of the resources, first productive spend metrics of a first distributed computing system of the plurality of distributed computing systems to second productive spend metrics for a second distributed computing system of the plurality of distributed computing systems;
controlling relocation of workload of the selected ones of the resources from the first distributed computing system of the plurality of distributed computing systems to the second distributed computing system of the plurality of distributed computing systems based on the comparison of the first and second productive spend metrics determined for the selected ones of the resources;
generating a first relocation scenario for relocating selected physical host machines from cabinets of the first distributed computing system of the plurality of distributed computing systems to cabinets of the second distributed computing system of the plurality of distributed computing systems;
generating estimates of productive spend metrics for the selected physical host machines if relocated to the second distributed computing system based on a prediction of utilization of resources of the selected physical host machines and costs associated with making the selected physical host machines available in the second distributed computing system;
determining whether the estimates of productive spend metrics for the selected physical host machines satisfy a defined rule;
initiating relocation of the selected physical host machines to the cabinets of the second distributed computing system according to the relocation scenario based on the estimates of productive spend metrics satisfying the defined rule;
generating an upgrade scenario for adding new physical host machines to cabinets to one of the first distributed computing systems of the plurality of distributed systems and the second distributed computing system of the plurality of distributed computing systems;
generating estimates of productive spend metrics for the new physical host machines if added to the one of the first distributed computing systems of the plurality of distributed systems and the second distributed computing system of the plurality of distributed computing systems based on a prediction of utilization metrics for the new physical host machines and costs associated with making the new physical host machines available in the one of the first distributed computing systems of the plurality of distributed systems and the second distributed computing system of the plurality of distributed computing systems;

determining whether the estimates of productive spend metrics for the new physical host machines satisfy a defined rule for adding new physical host machines; and initiating adding the new physical host machines to the cabinets of the one of the first distributed computing systems of the plurality of distributed systems and the second distributed computing system of the plurality of distributed computing systems according to the upgrade scenario based on the estimates of productive spend metrics satisfying the defined rule for adding new physical host machines.

\* \* \* \* \*